United States Patent
Lee et al.

(10) Patent No.: US 9,873,105 B2
(45) Date of Patent: Jan. 23, 2018

(54) SORBENT MATERIAL AND A METHOD FOR ENHANCING SORPTION PERFORMANCE THEREOF

(71) Applicant: City University of Hong Kong, Kowloon (HK)

(72) Inventors: Chun Sing Lee, Kowloon (HK); Yong Bin Tang, Kowloon (HK); Fu Lung Wong, Kowloon (HK); Chiu Yee Chan, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 159 days.

(21) Appl. No.: 14/522,833

(22) Filed: Oct. 24, 2014

(65) Prior Publication Data
US 2016/0114311 A1   Apr. 28, 2016

(51) Int. Cl.
*B01J 20/00* (2006.01)
*B01J 20/24* (2006.01)
(Continued)

(52) U.S. Cl.
CPC .......... *B01J 20/3007* (2013.01); *B01J 20/22* (2013.01); *B01J 20/26* (2013.01); *B01J 20/28002* (2013.01); *B01J 20/28014* (2013.01); *B01J 20/28033* (2013.01); *B01J 20/28054* (2013.01); *C02F 1/28* (2013.01); *C02F 1/681* (2013.01); *C09K 3/32* (2013.01); *B01J 20/2804* (2013.01); *B01J 20/28038* (2013.01); *B01J 20/28042* (2013.01); *B01J 20/28045* (2013.01); *B01J 20/28057* (2013.01); *B01J 20/28095* (2013.01); *C02F 1/285* (2013.01); *C02F 1/286* (2013.01); *C02F 1/288* (2013.01); *C02F 1/68* (2013.01);
(Continued)

(58) Field of Classification Search
CPC .......................................... A61F 2013/530875
See application file for complete search history.

(56) References Cited

U.S. PATENT DOCUMENTS 2,952,260 A * 9/1960 Burgeni ................. A61F 13/536
                                                          428/163
3,017,304 A * 1/1962 Burgeni .................. A61F 5/485
                                                          156/281
(Continued)

FOREIGN PATENT DOCUMENTS

DE      3546101 A1 *  6/1987  ............. A47L 13/16
DE      4338582 A1 *  5/1995  ............... C09K 3/32
(Continued)

OTHER PUBLICATIONS

Machine Translation of JP 2009041354 A, Feb. 2009.*
(Continued)

*Primary Examiner* — Jeff Vonch
(74) *Attorney, Agent, or Firm* — Renner Kenner Greive Bobak Taylor & Weber

(57) ABSTRACT

A method for enhancing sorption performance of a sorbent material includes the step of increasing a surface area of the sorbent material for adsorption of a fluid at an interface between the fluid and the sorbent material by arranging one or more apertures to be disposed on the sorbent material, wherein each of the one or more apertures is further arranged to define an interior space for absorption of the fluid.

10 Claims, 4 Drawing Sheets

(51) Int. Cl.

| | | |
|---|---|---|
| B01J 20/26 | (2006.01) | |
| B01J 20/28 | (2006.01) | |
| C02F 1/28 | (2006.01) | |
| C02F 1/40 | (2006.01) | |
| C02F 1/68 | (2006.01) | |
| E02B 15/10 | (2006.01) | |
| C09K 3/32 | (2006.01) | |
| B01J 20/30 | (2006.01) | |
| B01J 20/22 | (2006.01) | |
| C02F 103/00 | (2006.01) | |
| C02F 101/32 | (2006.01) | |

(52) U.S. Cl.
CPC .... *C02F 2101/32* (2013.01); *C02F 2103/007* (2013.01); *Y10S 210/924* (2013.01); *Y10T 428/24273* (2015.01); *Y10T 428/24306* (2015.01); *Y10T 428/24314* (2015.01)

(56) References Cited

U.S. PATENT DOCUMENTS

| | | | | | |
|---|---|---|---|---|---|
| 3,518,183 | A | * | 6/1970 | Evans | C02F 1/681 210/502.1 |
| 3,769,978 | A | * | 11/1973 | DeNight | A61F 13/533 604/374 |
| 3,862,963 | A | * | 1/1975 | Hoshi | B01J 20/26 210/502.1 |
| 3,966,597 | A | * | 6/1976 | Omori | B01D 17/0202 156/229 |
| 4,107,051 | A | * | 8/1978 | Lorentzen | B32B 5/08 210/500.1 |
| 4,183,984 | A | * | 1/1980 | Browers | B01D 17/0202 210/242.4 |
| 4,340,486 | A | * | 7/1982 | Swanson | C02F 1/681 210/693 |
| 4,784,892 | A | * | 11/1988 | Storey | B32B 38/06 15/209.1 |
| 4,832,852 | A | * | 5/1989 | Wells | D04H 1/425 134/6 |
| 4,840,734 | A | * | 6/1989 | Johnson | B01D 15/00 134/7 |
| 5,080,956 | A | * | 1/1992 | Smith | B08B 17/02 428/166 |
| 5,128,193 | A | * | 7/1992 | Anapol | A61F 13/533 156/209 |
| 5,360,654 | A | * | 11/1994 | Anderson | B01J 20/28014 156/62.4 |
| 5,397,316 | A | * | 3/1995 | LaVon | A61F 13/535 604/358 |
| 5,817,271 | A | * | 10/1998 | Congleton | A61F 13/15707 219/121.68 |
| 5,834,385 | A | * | 11/1998 | Blaney | B01J 20/28023 442/382 |
| 5,972,470 | A | * | 10/1999 | Engst | B01J 20/28004 184/106 |
| 6,110,863 | A | * | 8/2000 | Engst | B01J 20/28004 210/680 |
| 6,615,951 | B1 | * | 9/2003 | Boutin | E04B 1/86 181/293 |
| 6,865,784 | B2 | * | 3/2005 | Noelle | D04H 1/067 28/104 |
| 7,655,149 | B1 | * | 2/2010 | Shaffer | B01J 20/24 210/691 |
| 7,798,219 | B1 | | 9/2010 | Harnoy | |
| 8,343,352 | B2 | | 1/2013 | Dagesse | |
| 8,512,552 | B1 | | 8/2013 | Rossi | |
| 8,567,613 | B2 | | 10/2013 | Ciancaglini | |
| 2001/0023339 | A1 | * | 9/2001 | Onishi | A61F 13/532 604/378 |
| 2002/0151859 | A1 | * | 10/2002 | Schoelling | A61F 13/49 604/385.3 |
| 2003/0070995 | A1 | * | 4/2003 | Breitenbeck | C02F 1/681 210/693 |
| 2004/0035797 | A1 | * | 2/2004 | Brownstein | B01D 15/00 210/691 |
| 2005/0113807 | A1 | * | 5/2005 | Carlin | A61F 13/2051 604/358 |
| 2006/0266694 | A1 | * | 11/2006 | Broje | B01D 17/0202 210/402 |
| 2007/0299416 | A1 | * | 12/2007 | Noda | A61F 13/15634 604/367 |
| 2010/0320151 | A1 | * | 12/2010 | Dagesse | E02B 15/101 210/671 |
| 2011/0297619 | A1 | * | 12/2011 | Kurtzman | E02B 15/101 210/693 |
| 2014/0217004 | A1 | * | 8/2014 | Ozersky | E02B 15/045 210/242.4 |
| 2015/0202562 | A1 | * | 7/2015 | Incorvia | B01J 20/18 96/153 |

FOREIGN PATENT DOCUMENTS

| | | | | | |
|---|---|---|---|---|---|
| DE | 10303198 | A1 | * | 7/2004 | ............ C02F 1/681 |
| DE | 202010006054 | | * | 8/2011 | ............ B32B 3/02 |
| EP | 0293208 | A1 | * | 11/1988 | ............ A61F 13/534 |
| EP | 0458655 | A1 | * | 11/1991 | ............ A47L 1/15 |
| EP | 0644248 | A1 | * | 3/1995 | ............ C02F 1/681 |
| GB | 2062713 | A | * | 5/1981 | ............ D04H 1/425 |
| GB | 2342662 | A | * | 4/2000 | ............ D04H 1/10 |
| JP | 61283308 | A | * | 12/1986 | |
| JP | 03234852 | A | * | 10/1991 | |
| JP | 07100376 | A | * | 4/1995 | |
| JP | 2009041354 | A | * | 2/2009 | |

OTHER PUBLICATIONS

Schatzberg, Investigation of Sorbents for Removing Oil Spills from Waters, Sep. 2014.*

Karan et al., Oil spill cleanup by structured fibre assembly, Mar. 2011.*

Wang, A comparative study of oil sorbency using cotton and polyurethane foam as sorbents, 1974 (no month).*

Bayat et al., Oil Spill Cleanup from Sea Water by Sorbent Materials, Nov. 2005.*

SPC, Sorbents & Spill Control, Oct. 2014.*

* cited by examiner

SORBENT MATERIAL AND A METHOD FOR ENHANCING SORPTION PERFORMANCE THEREOF

TECHNICAL FIELD

The present invention relates to a method for enhancing sorption performance of a sorbent material, and particularly, although not exclusively, to a method for enhancing the sorption performances of various existing sorbents used in liquid spill treatments.

BACKGROUND

Sorbents are used in various liquid spill treatments and are highly effective for cleaning up and/or recovering spilled liquid wastes such as chemicals or pollutants. Depending on the chemical nature of the spilled liquid, the sorbent material may either be hydrophobic or hydrophilic.

In general, sorbent materials can allow for absorption and/or adsorption of the spilled liquid. For absorption, the liquid penetrates into and is physically incorporated into the body of the material. On the other hand, for adsorption, the liquid is largely chemically incorporated to the surface of the sorbent material. In most liquid sorption cases, the action of liquid uptake by the sorbent is through adsorption. The mechanisms that affect the adsorption properties of a sorbent material include the wetting properties of the sorbent material, capillary action of the liquid in the sorbent material, cohesion/adhesion of the liquid as well as the available surface area of the sorbent material, etc.

SUMMARY OF THE INVENTION

In accordance with a first aspect of the present invention, there is provided a method for enhancing sorption performance of a sorbent material comprising the step of increasing a surface area of the sorbent material for adsorption of a fluid at an interface between the fluid and the sorbent material by arranging one or more apertures to be disposed on the sorbent material, wherein each of the one or more apertures is further arranged to define an interior space for absorption of the fluid.

In a preferred embodiment of the first aspect, the step of arranging one or more apertures to be disposed on the sorbent material includes cutting, drilling, forging or mold pressing the one or more apertures on the sorbent material.

In one embodiment of the first aspect, the sorbent material is in the form of a boom, a mat, a pad, a roll, a sheet, or a cushion.

In one embodiment of the first aspect, each of the one or more apertures may be a circular, elliptical, polygonal, or other regular or irregular shaped hole or groove.

In one embodiment of the first aspect, the one or more apertures have different shape. However in an alternative embodiment the one or more apertures have the same shape.

In a preferred embodiment of the first aspect, each of the one or more apertures has a cross sectional area of 10 mm$^2$ to 500 mm$^2$.

In one embodiment of the first aspect, the one or more apertures are arranged to penetrate partly into or completely through the sorbent material.

In one embodiment of the first aspect, the one or more apertures are arranged to penetrate perpendicularly or obliquely to a surface of the sorbent material.

In a preferred embodiment of the first aspect, the array is a one dimensional array, a two dimensional array or a three dimensional array.

In a preferred embodiment of the second aspect, the sorbent material has a surface area to volume ratio of 1.3 to 2.5.

In one embodiment of the first aspect, each row is aligned in parallel with an adjacent row and each column is aligned in parallel with an adjacent column such that each of the apertures is aligned with apertures in an immediate adjacent row and an immediate adjacent column. In another embodiment of the first aspect, each row is aligned in parallel with an adjacent row and each of the apertures in the same row is offset from the corresponding hole in an immediate adjacent row.

In one embodiment of the first aspect, the one or more apertures are arranged to be disposed evenly on the sorbent material. However, in an alternative embodiment of the first aspect, the one or more apertures are arranged to be disposed unevenly on the sorbent material.

In a preferred embodiment of the first aspect, the one or more apertures are arranged to be disposed on the sorbent material with a distribution density of 0.003 to 0.5 apertures per square centimeter.

In one embodiment of the first aspect, the fluid comprises liquid or gas.

In one embodiment of the first aspect, the sorbent material is porous and is selected from at least one of polymeric foams, sponges, cottons, paper-pulp, animal feathers, wools, and plant fibers.

In a preferred embodiment of the first aspect, the sorbent material is arranged for treating spills of a high viscosity liquid. Preferably, the viscosity of the high viscosity liquid is 350 to 1200 mPa·s.

In one embodiment of the first aspect, the one or more apertures are arranged to penetrate one-third to half of a thickness of the sorbent material.

In accordance with a second aspect of the present invention, there is provided a sorbent material comprising: a body; and one or more apertures arranged to be disposed on the body for increasing the surface area of the sorbent material for adsorption of a fluid at an interface between the fluid and the sorbent material; wherein each of the one or more apertures is further arranged to define an interior space for absorption of the fluid.

In one embodiment of the second aspect, the body of sorbent material is in the form of a boom, a mat, a pad, a roll, a sheet, or a cushion.

In one embodiment of the second aspect, each of the one or more apertures includes a circular, elliptical, polygonal, or other regular or irregular shaped hole or groove.

In one embodiment of the second aspect, the one or more apertures have different shape. However, in an alternative embodiment of the second aspect, the one or more apertures have the same shape.

In one embodiment of the second aspect, the one or more apertures are arranged to penetrate partly into or completely through the body of the sorbent material.

In a preferred embodiment of the second aspect, each of the one or more apertures has a cross sectional area of 10 mm$^2$ to 500 mm$^2$.

In one embodiment of the second aspect, the one or more apertures are arranged to penetrate perpendicularly or obliquely to a surface of the body of the sorbent material.

In a preferred embodiment of the second aspect, the apertures are arranged in a one dimensional array, a two dimensional array or a three dimensional array on the body of the sorbent material.

In one embodiment of the second aspect, the one or more apertures are arranged to be disposed evenly on the body of the sorbent material. However, in an alternative embodiment of the second aspect, the one or more apertures are arranged to be disposed unevenly on the body of the sorbent material.

In a preferred embodiment of the second aspect, the one or more apertures are arranged to be disposed on the body of the sorbent material with a distribution density of 0.003 to 0.5 apertures per square centimeter.

In one embodiment of the second aspect, the fluid comprises liquid or gas.

In one embodiment of the second aspect, the body is porous; and the sorbent material is selected from at least one of polymeric foams, sponges, cottons, paper-pulp, animal feathers, wools, and plant fibers.

In a preferred embodiment of the second aspect, the sorbent material is arranged for treating spills of a high viscosity liquid. Preferably, the viscosity of the high viscosity liquid is 350 to 1200 mPa·s.

In a preferred embodiment of the second aspect, the one or more apertures are arranged to penetrate one-third to half of a thickness of the sorbent material.

In a preferred embodiment of the second aspect, the sorbent material has a surface area to volume ratio of 1.3 to 2.5.

It is an object of the present invention to address the above needs, to overcome or substantially ameliorate the above disadvantages or, more generally, to provide a simple, low cost and effective method for further enhancing the sorption performance, in particular the mass ratio of the sorbed liquid to the sorbent, of various liquid spill sorbents.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1A:
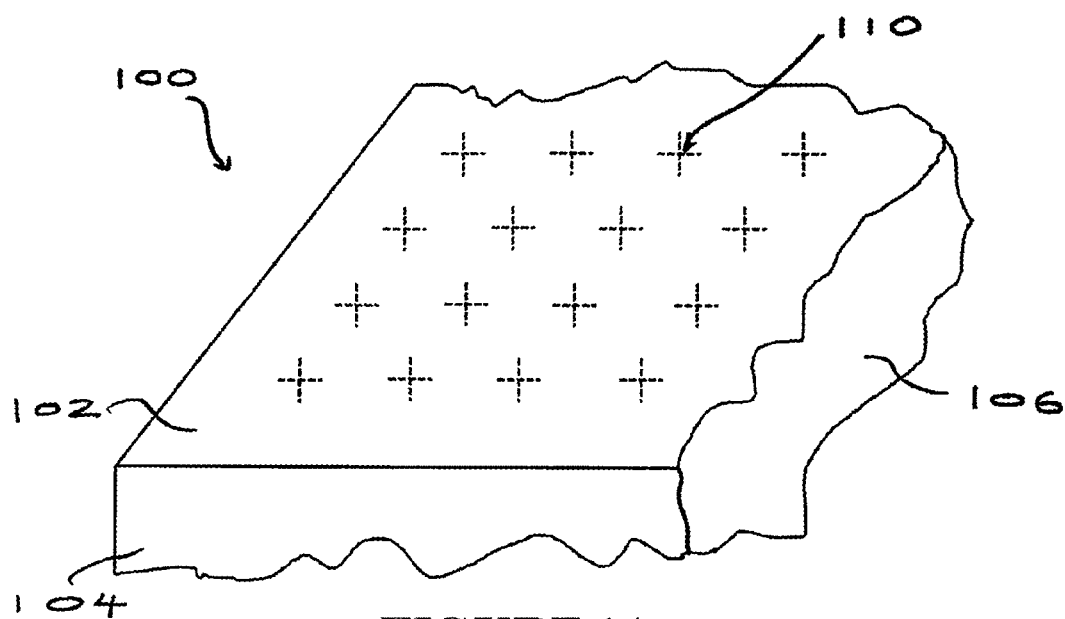
FIG. 1A shows a schematic side perspective illustration of an arrayed distribution of apertures in a sorbent body in accordance with one embodiment of the present invention.

Without wishing to be bounded by theory, the Inventors have, through trials, research and experimentation, found that various materials can be used as a sorbent in liquid spill treatment. In particular, non-toxic and solvent free absorbents are highly preferable in the use for liquid spill sorption as they are relatively environmental friendly and the sorbed liquid can be easily separated and thus re-useable. Materials for these non-toxic and solvent free absorbents include synthetic materials such as polypropylene and other polymeric materials; inorganic materials such as pumice and vermiculite; and organic materials such as bagasse, bark, cork, chicken feathers, human hair, peat, sawdust, straw, paper pulp and wool, etc. Among these three types of materials, synthetic sorbents materials are generally considered to be the most effective in recovering liquid waste. In some cases, a mass ratio of the sorbed liquid to the sorbent material of 40 gram/gram can be achieved for synthetic sorbents materials, compared to a mass ratio of 10 gram/gram for organic materials and a mass ratio of 2 gram/gram for inorganic materials.

Ideally, a sorbent material should have a high surface area (including both external and internal surface) to volume ratio. In particular, for high viscosity liquid that is difficult to flow rapidly into a sorbent material, the sorption performance of the sorbent will be determined mainly by the available external surface area.

The Inventors have also found that existing sorbent products are mostly homogeneous and have continuous planar flat surfaces. A number of existing sorbent products do appear to have some hole-like structures formed on their surface, but these hole-like structures are merely spots formed for spun bonding of the laminated component layers and thus they do not contribute to enhancing the sorption ability of the product by providing a higher surface area to volume ratio. In either case, as a result, the inner volume of these existing sorbent products has not been fully utilized for spill treatments, i.e. in most cases the inner volume of the sorbent material remains unused or un-sorbed. And this situation is particularly evident for the sorption of high viscosity liquid, where the liquid is too viscous to penetrate in the sorbent structure.

Referring to FIGS. 1A-3, there is provided a method for enhancing sorption performance of a sorbent material comprising the step of increasing a surface area of the sorbent material for adsorption of a fluid at an interface between the fluid and the sorbent material by arranging one or more apertures to be disposed on the sorbent material, wherein each of the one or more apertures is further arranged to define an interior space for absorption of the fluid. FIGS. 1A-3 also provide a sorbent material comprising: a body; and one or more apertures arranged to be disposed on the body for increasing the surface area of the sorbent material for adsorption of a fluid at an interface between the fluid and the sorbent material; wherein each of the one or more apertures is further arranged to define an interior space for absorption of the fluid.

Figure 1B:
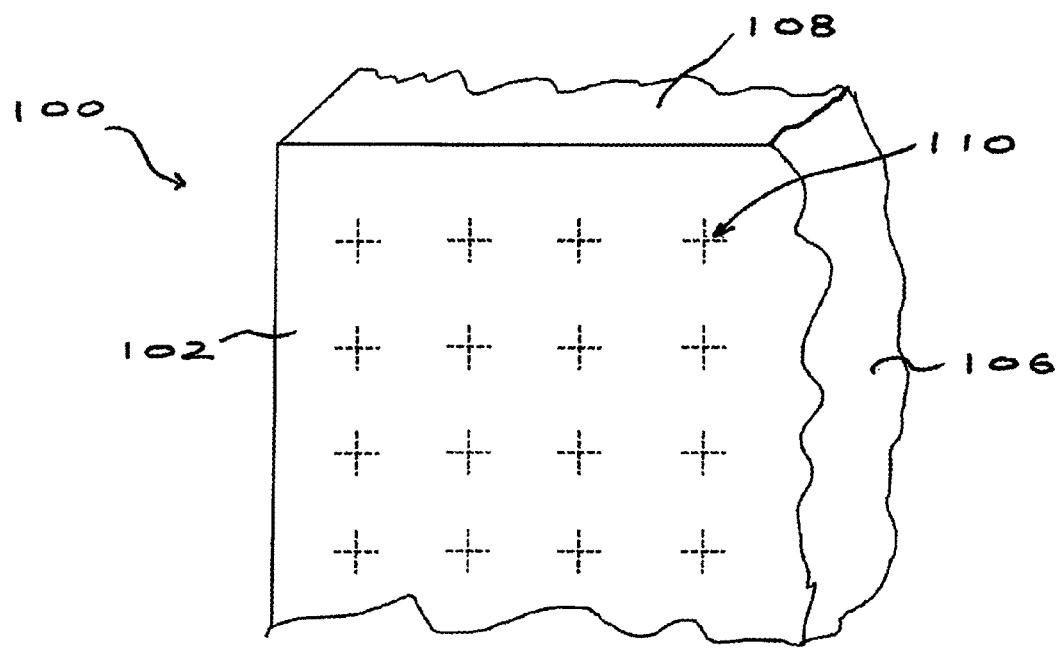
FIG. 1B shows a schematic top perspective illustration of an arrayed distribution of apertures in a sorbent body in accordance with one embodiment of the present invention.

FIGS. 1A-1B show a sorbent material body 100 (fragmented) for sorption of a fluid such as air or liquid in accordance with one embodiment of the present invention. The sorbent material body 100 in this embodiment may be a new or an existing sorbent material. The sorbent material body 100, although shown fragmented in FIGS. 1A-1B, has a three dimensional structure with a plurality of surfaces 102, 104, 106, 108. The sorbent material body 100 in the present embodiment may be in the form of a boom, a mat, a pad, a roll, a sheet, or a cushion, or any other structure and form. Preferably, the sorbent material of the sorbent material body 100 has a porous and homogenous structure such that permanent apertures could be readily arranged on the at least one of its surfaces 102, 104, 106, 108. Examples of the sorbent material that can be used in the present invention include, but are not limited to, polymeric foams, sponges, cottons, paper-pulp, animal feathers, wools, and plant fibers, etc.

In the present embodiment of FIGS. 1A-1B, a number of apertures 110 are arranged on a surface 102 of the sorbent material body 100. Preferably, the apertures 110 are arranged on the sorbent material body 100 by cutting, drilling, forging or mold pressing. In the present invention, each of the apertures 110 may be a circular, elliptical, polygonal, or other regular or irregular shaped hole or groove, and they may have the same or different shapes. Also, the apertures 110 may be arranged to penetrate partly into or completely through the sorbent material body 100. In a specific embodiment, if the apertures 110 are holes then they preferably penetrate completely through the sorbent material body 100, whereas if the apertures 110 are grooves, then they preferably penetrate one-third to half of an overall thickness of the sorbent material body 100. Preferably, the apertures 110 are arranged to penetrate perpendicularly or obliquely at an angle to a surface 102 of the sorbent material body 100.

As shown in FIGS. 1A-1B, the apertures 110 are arranged in a two dimensional array on the surface 102. In particular, the array includes a plurality of rows and columns, with each row aligned in parallel with an adjacent row and each column aligned in parallel with an adjacent column such that each of the apertures 110 is aligned with apertures in an immediate adjacent row and an immediate adjacent column. In the present embodiment, the apertures 110 are evenly distributed on the surface 102. Preferably in the present embodiment each of the apertures 110 has a cross sectional area of about 10 mm$^2$ to 500 mm$^2$, and the apertures are preferably arranged on the surface 102 of the sorbent material body 100 with a distribution density of 0.003 to 0.5 apertures per square centimeter.

Figure 2A:
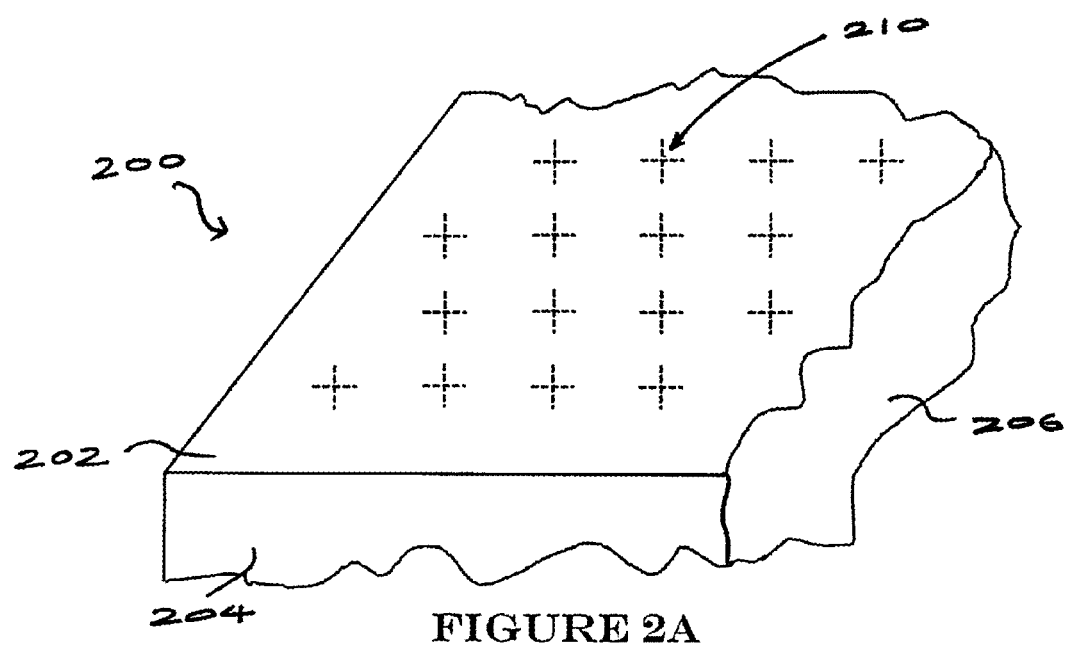
FIG. 2A shows a schematic side perspective illustration of another arrayed distribution of apertures in a sorbent body in accordance with an alternative embodiment of the present invention.
Figure 2B:
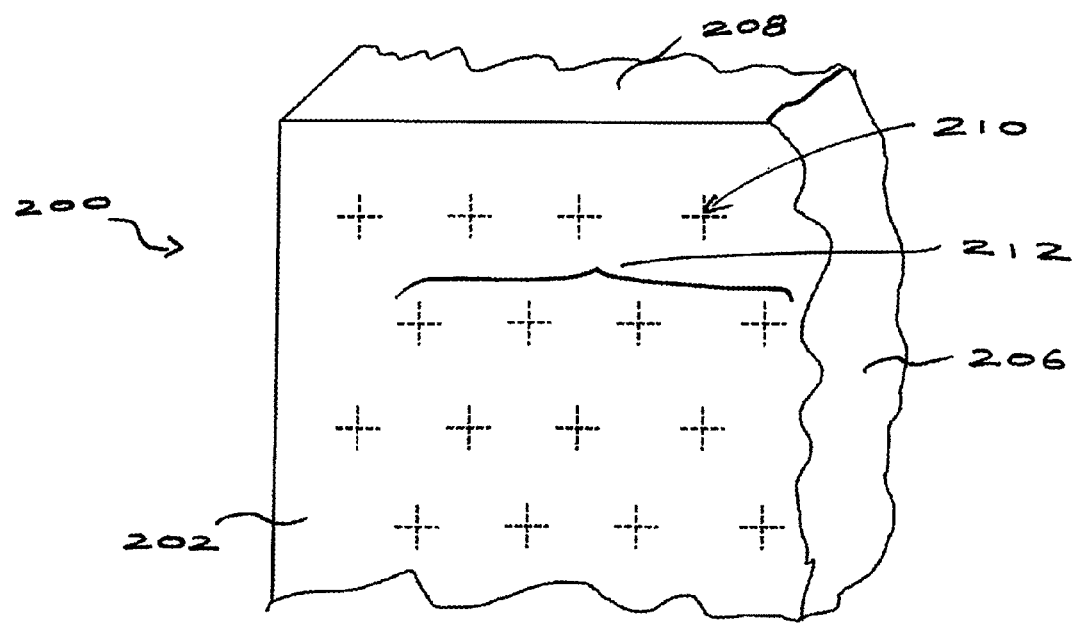
FIG. 2B shows a schematic top perspective illustration of another arrayed distribution of apertures in a sorbent body in accordance with an alternative embodiment of the present invention.

FIGS. 2A-2B show a sorbent material body 200 (fragmented) for sorption of a fluid such as air or liquid in accordance with another embodiment of the present invention. The construction of the sorbent material body in this embodiment is substantially the same as that in FIGS. 1A-1B, and thus similar numbers such as 110 & 210; and 120 & 220 refer to similar structures/components. The only difference between the sorbent material body 200 in the present embodiment of FIGS. 2A-2B and that in the embodiment of FIGS. 1A-1B is that in the present embodiment the apertures 210 are arranged in an array of a different shape. Specifically, in this embodiment, the apertures 210 are arranged in rows 212 and each row is aligned in parallel with an adjacent row, and each of the apertures 210 in the same row 212 is offset from the corresponding hole in an immediate adjacent row. Essentially, the arrangement of apertures 110 in FIGS. 1A-1B is in an "AAA" array and the arrangement of the apertures 210 in FIGS. 2A-2B is in an "ABA" array.

Although in illustrated embodiments only one of the surfaces 102, 202 of the sorbent material body 100, 200 is arranged with apertures 110, 210, in alternative embodiments, one or more of the other surfaces 104, 106, 108, 204, 206, 208 may also be arranged with at least one aperture or an array of apertures. Also, although in the illustrated embodiments the apertures 110, 210 are shown to be arranged in a two dimensional array, in other embodiments, the apertures can be arranged in one dimensional, two dimensional or three dimensional arrays of any shape and form on one or more surfaces of the sorbent body. It is also possible for the apertures 110, 210 to be disposed unevenly on the sorbent material body 100, 200. In the present invention, the sorbent material body 100, 200 preferably has a surface area to volume ratio of 1.3 to 2.5.

Figure 3:
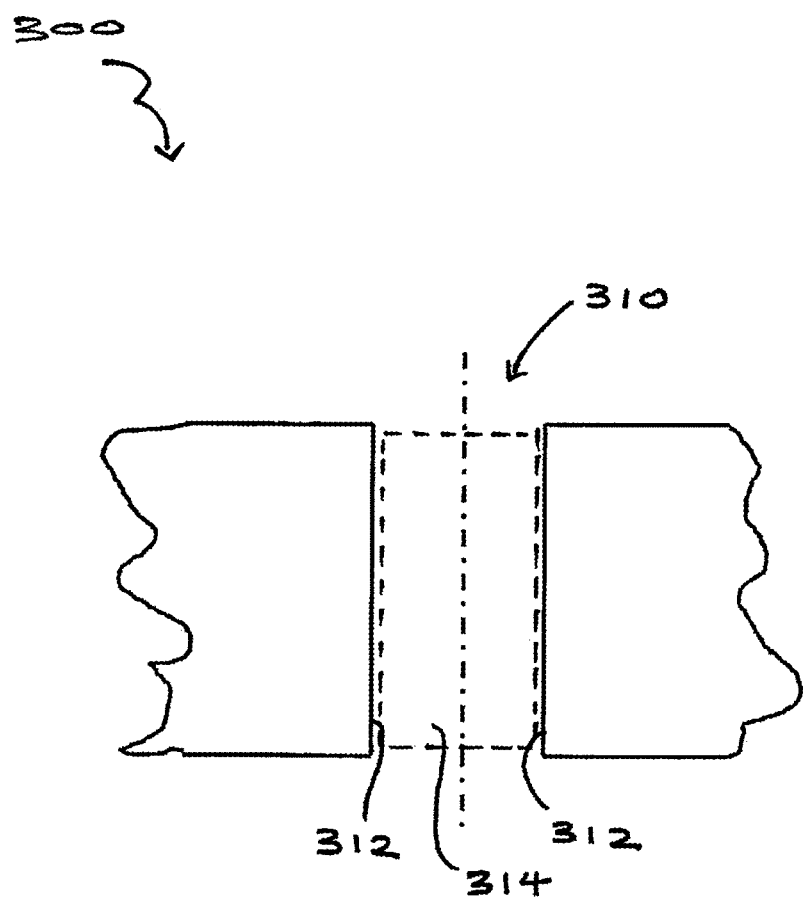
FIG. 3 is a cross-section illustration of an aperture arranged on the sorbent material body in accordance with one embodiment of the present invention.

FIG. 3 shows a cross-section of an aperture 310 arranged on the sorbent material body 300 in accordance with one embodiment of the present invention. As shown in FIG. 3, the cutting, drilling, forging or mold pressing of an aperture 310 on a surface of the sorbent material body 300 provides an aperture defined by an inner wall portion 312 of the sorbent material body, and an interior space 314 is defined within the inner wall portion 312.

By arranging an aperture 310 on a surface of the sorbent material 300, the surface area of the sorbent material body 300 for adsorption of a fluid at an interface between the fluid and the sorbent material (the inner wall portion 312) is substantially increased. Moreover, the interior space 314 provided by the aperture 310 can effectively retain fluid therein, and allows the fluid to enter the internal volume of the sorbent material body 300 more readily, thereby providing improved absorption performance. The improvement in both adsorption and absorption performances of the sorbent material body 300 can therefore provide improved sorption speed and sorption material utilization. This leads to an increase in the sorption effectiveness and efficiency of the sorbent material body 300.

Without deviating from the spirit of the present invention, a person skilled in the art would readily appreciate that the aperture 310 in FIG. 3 may be a circular, elliptical, polygonal, or other regular or irregular shaped hole or groove, or has a cross sectional area of 10 mm$^2$ to 500 mm$^2$. Also, the aperture 310 may be arranged to penetrate partly into or completely through the sorbent material body 300, perpendicularly or obliquely at an angle to a surface of the sorbent material body 300.

EXAMPLES

In the present invention, the construction of the sorption material body with apertures provides enhanced sorption performance, i.e. an increased mass ratio of the sorbed liquid to the sorbent. A sorption test was conducted on different sorption material samples of different constructions (with or without holes, different hole densities, different fluid viscosity) in order to determine the mass ratio of the sorbed liquid to the sorbent of a particular sorbent to a particular liquid.

In the test, the sorbent samples were immersed into a liquid to undergo the liquid sorption. By measuring the initial weight ($M_i$) of the sorbent and the final weight ($M_f$) of the sorbent after the sorption test, the mass ratio of the sorbed liquid to the sorbent can then be calculated by the formula: (Mf−Mi)/Mi.

Table 1 below shows the ratio of the sorbed liquid to the sorbent for different sorbent samples and fluid samples used.

| Sorbent sample | Hole density (per cm$^2$) | Hole diameter (mm) | Viscosity of fluid (mPa · s.) | Mass ratio of the sorbed liquid to the sorbent |
|---|---|---|---|---|
| A | NA | NA | 350 | 45 |
| B | 0.055 | 10 | 350 | 52 |

-continued

| Sorbent sample | Hole density (per cm²) | Hole diameter (mm) | Viscosity of fluid (mPa · s.) | Mass ratio of the sorbed liquid to the sorbent |
|---|---|---|---|---|
| C | 0.055 | 19 | 350 | 53 |
| D | NA | NA | 500 | 47 |
| E | 0.055 | 10 | 500 | 57 |
| F | 0.055 | 19 | 500 | 56 |
| G | NA | NA | 1200 | 46 |
| H | 0.055 | 10 | 1200 | 61 |
| I | 0.055 | 19 | 1200 | 54 |
| J | NA | NA | 1200 | 46 |
| K | 0.14 | 10 | 1200 | 57 |
| L | 0.22 | 10 | 1200 | 53 |

3 pieces of initially identical size mat-type oil sorbent were used in this test. The first sorbent A was untreated. The second sorbent B was introduced with holes of a hole distribution density of 0.055 per square centimeter and a hole diameter of 10 mm (correspond to a cross section are of 78.5 mm²). The third sorbent C was introduced with holes of a hole distribution density of 0.055 per square centimeter and hole diameter of 19 mm (correspond to a cross section are of 283 mm²). Sorbents A, B and C were subjected to oil sorption test with mechanical oil having a viscosity of 350 mPa·s. for a sorption time of 5 minutes. As shown in Table 1, the resulting mass ratio of the sorbed liquid to the sorbent of the hole-introduced oil sorbent B and C is around 17% and 18% higher than that of the untreated sorbent A respectively.

Test 2

3 pieces of initially identical size mat-type oil sorbent were used in this test. The first sorbent D was untreated. The second sorbent E was introduced with holes of a hole distribution density of 0.055 per square centimeter and a hole diameter of 10 mm (correspond to a cross section are of 78.5 mm²). The third sorbent F was introduced with holes of a hole distribution density of 0.055 per square centimeter and hole diameter of 19 mm (correspond to a cross section are of 283 mm²). D, E and F were subjected to oil sorption test with mechanical oil with a viscosity of 500 mPa·s. for a sorption time 5 of minutes. As shown in Table 1, the resulting mass ratio of the sorbed liquid to the sorbent of the hole-introduced oil sorbent E and F is around 21% and 19% higher than that of the untreated sorbent D respectively.

Test 3

3 pieces of initially identical size mat-type oil sorbent were used in this test. The first sorbent G was untreated. The second sorbent H was introduced with holes of a hole distribution density of 0.055 per square centimeter and a hole diameter of 10 mm (correspond to a cross section are of 78.5 mm²). The third sorbent I was introduced with holes of a hole distribution density of 0.055 per square centimeter and hole diameter of 19 mm (correspond to a cross section are of 283 mm²). G, H and I were subjected to oil sorption test with mechanical oil with a viscosity of 1200 mPa·s. for a sorption time of 5 minutes. As shown in Table 1, the resulting mass ratio of the sorbed liquid to the sorbent of the hole-introduced oil sorbent H and I is around 33% and 17% higher than that of the untreated sorbent G respectively.

Test 4

3 pieces of initially identical size mat-type oil sorbent were used in this test. The first sorbent J was untreated. The second sorbent K was introduced with holes of a hole distribution density of 0.14 per square centimeter and a hole diameter of 10 mm (correspond to a cross section are of 78.5 mm²). The third sorbent L was introduced with holes of a hole distribution density of 0.22 per square centimeter and a hole diameter of 10 mm (correspond to a cross section are of 78.5 mm²). J, K and L were subjected to oil sorption test with mechanical oil with a viscosity of 1200 mPa·s. for a sorption time of 5 min. As shown in Table 1, the resulting mass ratio of the sorbed liquid to the sorbent of the hole-introduced oil sorbent K and L is around 24% and 15% higher than that of the untreated sorbent J respectively.

Figure 4:
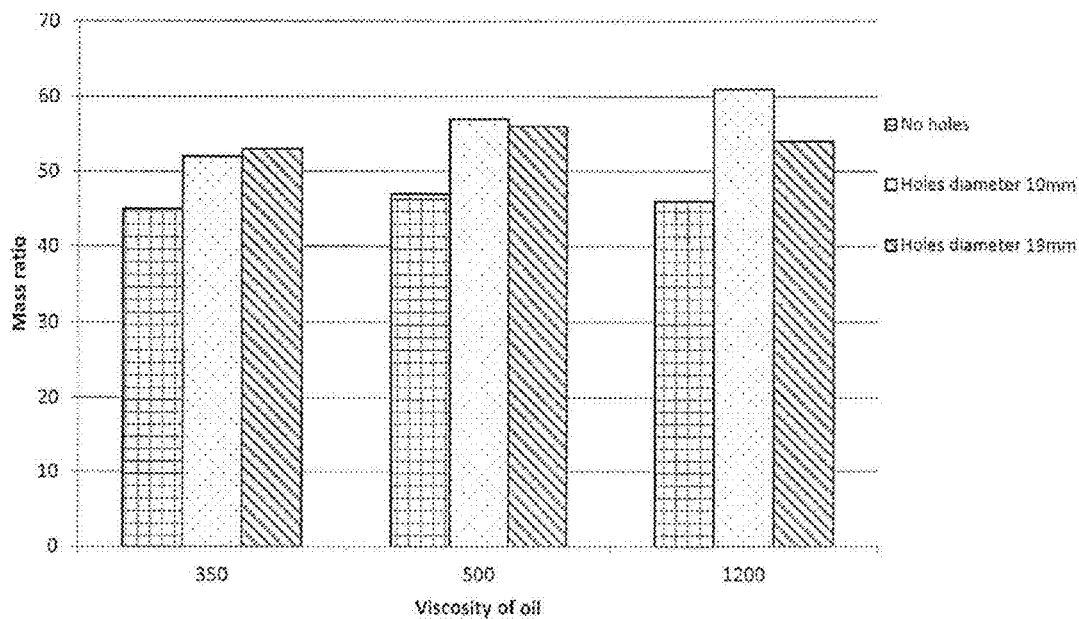
FIG. 4 is a plot showing the comparison of the mass ratios of the sorbent material before and after being arranged with holes with different diameters in accordance with one embodiment of the present invention.

FIG. 4 shows a plot of the test results of Table 1, comparing of the mass ratios of the sorbent materials before and after being arranged with holes of different diameters, subjected to oil of different viscosities. As shown in FIG. 4, sorbent materials arranged with holes of either 10 mm or 19 mm provide significantly enhanced sorption performance, as reflected from the increased mass ratios compared to that of the sorbent material without holes.

Figure 5:
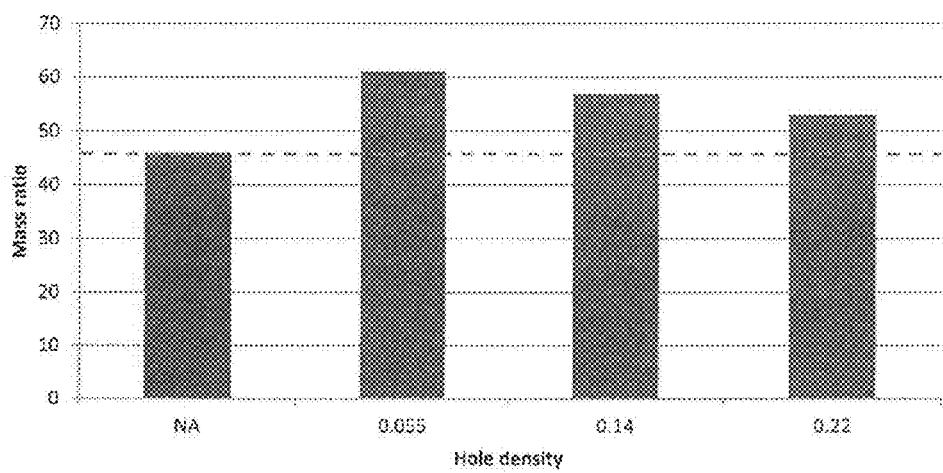
FIG. 5 is a plot showing the effect of hole density on the sorbent material on the mass ratio of the sorbed liquid to the sorbent material in accordance with one embodiment of the present invention.

FIG. 5 shows a plot of the test results of Table 1, comparing the effect of hole density on the sorbent material on the mass ratio of the sorbed liquid to the sorbent material. As shown in FIG. 5, sorbent samples arranged with holes of different densities provide a substantially improved mass ratio value to that of the sample without holes.

By arranging one or more apertures in the form of hole or groove in a sorbent material in the embodiments of the present invention, the present invention provides a sorbent material with improved absorption and adsorption performances, which is particularly advantageous. More particularly, by using a sorbent material body with apertures, liquid can be sorbed more rapidly and to a deeper region of the sorbent body that may not have been utilized on sorbent without apertures. The method of the present invention allows the liquid to penetrate and diffuse into the sorbent body structure more rapidly and allowing more inner surfaces and spaces of the sorbent material to be utilized for absorption and adsorption of the liquid more effectively. The present invention is particularly useful for sorbent materials that are arranged for treating spills of a high viscosity liquid.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A liquid sorbent comprising:
   a body having a homogenous structure; and
   a plurality of apertures cut or drilled on the body, the plurality of apertures penetrating one-third to half of a thickness of the liquid sorbent and defining an interior space for absorption and adsorption of a liquid with a viscosity of 350 to 1200 mPa·s;
   wherein the liquid sorbent has a surface area to volume ratio of 1.3 cm$^{-1}$ to 2.5 cm$^{-1}$;
   wherein each of the plurality of apertures has a cross sectional area of 78.5 mm² to 283 mm²; and
   wherein the plurality of apertures are disposed on the body of the liquid sorbent with a distribution density of 0.003 to 0.5 apertures per square centimeter.

2. The liquid sorbent in accordance with claim 1, wherein the body of liquid sorbent is in the form of a boom, a mat, a pad, a roll, a sheet, or a cushion.

3. The liquid sorbent in accordance with claim 1, wherein the plurality of apertures are circular, elliptical, polygonal, or have other regular or irregular shape.

4. The liquid sorbent in accordance with claim 3, wherein the plurality of apertures have different shapes.

5. The liquid sorbent in accordance with claim 3, wherein the plurality of apertures have the same shape.

6. The liquid sorbent in accordance with claim 1, wherein the plurality of apertures are arranged to penetrate perpendicularly or obliquely to a surface of the body of the liquid sorbent.

7. The liquid sorbent in accordance with claim 1, wherein the plurality of apertures are arranged in a one dimensional array, a two dimensional array or a three dimensional array on the body of the liquid sorbent.

8. The liquid sorbent in accordance with claim 1, wherein the apertures are arranged to be disposed evenly on the body of the liquid sorbent.

9. The liquid sorbent in accordance with claim 1, wherein the apertures are arranged to be disposed unevenly on the body of the liquid sorbent.

10. The liquid sorbent in accordance with claim 1, wherein the liquid sorbent is made from at least one material selected from the group consisting of polymeric foams, sponges, cottons, paper-pulp, wools, and plant fibers.

\* \* \* \* \*